United States Patent
Yin

(10) Patent No.: US 11,399,239 B2
(45) Date of Patent: Jul. 26, 2022

(54) AUDIO CALIBRATION SYSTEM

(71) Applicant: Scent Blaster Limited, Hong Kong (CN)

(72) Inventor: Liyan Yin, Ankang (CN)

(*) Notice: Subject to any disclaimer, the term of this patent is extended or adjusted under 35 U.S.C. 154(b) by 49 days.

(21) Appl. No.: 17/170,497

(22) Filed: Feb. 8, 2021

(65) Prior Publication Data

US 2021/0321202 A1 Oct. 14, 2021

(30) Foreign Application Priority Data

Apr. 9, 2020 (CN) ............................ 202020508793.9

(51) Int. Cl.
| | |
|---|---|
| H04R 25/00 | (2006.01) |
| H04R 3/12 | (2006.01) |
| H04S 7/00 | (2006.01) |
| G06F 16/61 | (2019.01) |
| G06F 16/65 | (2019.01) |
| H04R 3/04 | (2006.01) |

(52) U.S. Cl.
CPC ............ *H04R 25/305* (2013.01); *G06F 16/61* (2019.01); *G06F 16/65* (2019.01); *H04R 3/04* (2013.01); *H04R 3/12* (2013.01); *H04S 7/301* (2013.01)

(58) Field of Classification Search
None
See application file for complete search history.

(56) References Cited

U.S. PATENT DOCUMENTS

| | | | | |
|---|---|---|---|---|
| 5,928,160 | A * | 7/1999 | Clark | ..................... A61B 5/12 73/585 |
| 2013/0003981 | A1* | 1/2013 | Lane | ................... H04R 29/001 381/58 |
| 2015/0257683 | A1* | 9/2015 | Ashmore | ............ A61B 5/0022 600/559 |
| 2020/0005759 | A1* | 1/2020 | Alderson | ......... G10K 11/17825 |

FOREIGN PATENT DOCUMENTS

| | | | | |
|---|---|---|---|---|
| WO | WO-2016027139 A1 * | 2/2016 | ........... A61B 5/0022 |
| WO | WO-2016071221 A1 * | 5/2016 | .............. H04M 1/24 |
| WO | WO-2019200384 A1 * | 10/2019 | ............. A61B 5/121 |

* cited by examiner

*Primary Examiner* — Walter F Briney, III
(74) *Attorney, Agent, or Firm* — Chun-Ming Shih; HDLS IPR Services

(57) ABSTRACT

An audio calibration system applied to a hearing detection device includes an audio generator, a cloud server, a mobile computing device, and an audio playback unit. The audio generator plays a first test sound. A sound pressure level of the first test sound at any frequency between 500 Hz and 4000 Hz is Z. A computing unit of the mobile computing device generates a first value X after receiving the first test sound through a microphone, and the computing unit generates a second value Y after receiving a second test sound through the microphone. The audio playback unit receives an audio command from an audio control interface, and plays the second test sound to the microphone. The computing unit obtains a calibration value through a relational expression of Z+(Y−X).

10 Claims, 4 Drawing Sheets

AUDIO CALIBRATION SYSTEM

BACKGROUND

Technical Field

The present disclosure relates to an audio calibration system, and more particularly to an audio calibration system that is applied to a mobile device without any pre-calibrating audio playback unit.

Description of Related Art

The statements in this section merely provide background information related to the present disclosure and do not necessarily constitute prior art.

Regarding voice devices are now commonly used in smart homes and digital electronic products that connect various functions. Since voice service modules (such as voice assistants, voice services of telephone, or other related voice service devices, etc.) that can respond to people are not adjusted for people with poor or impaired hearing, it is easy to cause response troubles and various inconveniences in life for people with poor or impaired hearing to use ordinary voice service modules. Therefore, in order to make it more convenient for all users to use the voice service module, it is necessary to perform different hearing compensation adjustments for different users when using the voice service module.

However, the method of hearing compensation adjustment in the prior art must use some professional equipment that is fully calibrated (such as special-specification sound sources and pickups) to obtain hearing curves corresponding to different users. It is easy to cause time or cost troubles for general users.

Therefore, how to design an audio calibration system, and more particularly to solve the aforementioned technical problems of must use some professional equipment that is fully calibrated to obtain hearing curves corresponding to different users in the prior art, was studied by inventor of the present disclosure.

SUMMARY

A purpose of the present disclosure is to provide an audio calibration system that can solve the technical problems of must use some professional equipment that is fully calibrated to obtain hearing curves corresponding to different users in the prior art, which helps users save time and cost, so as to achieve the purpose of convenient to perform hearing detection for users.

In order to achieve the purpose, the audio calibration system applied to a hearing detection device, and the audio calibration system includes an audio generator, a cloud server, a mobile computing device, and an audio playback unit. The audio generator plays a first test sound, and a sound pressure level of the first test sound at any frequency between 500 Hz and 4000 Hz is Z. The mobile computing device is coupled to the cloud server, and includes a microphone, a computing unit, a memory, and an audio control interface. The computing unit is coupled to the microphone, the memory, and the audio control interface. The computing unit generates a first value X after receiving the first test sound played by the audio generator through the microphone, and the computing unit generates a second value Y after receiving a second test sound through the microphone. The memory stores the first value X and the second value Y. The audio control interface outputs an audio command outside the mobile computing device. The audio playback unit is removably coupled to the mobile computing device, the audio playback unit receives the audio command from the audio control interface, and plays the second test sound to the microphone. The computing unit obtains a calibration value through a relational expression of $Z+(Y-X)$ for the hearing detection device to perform a hearing detection procedure according to the calibration value and the audio playback unit.

Further, in the audio calibration system, the number of the audio generator is plural, the cloud server stores a plurality of the sound pressure levels corresponding to different audio generators, and the computing unit obtains one of the sound pressure levels from the cloud server according to a product identification code corresponding to any one of the audio generators, or the computing unit directly reads contents of the product identification code to obtain one of the sound pressure levels.

Further, in the audio calibration system, the product identification code includes a character code, a one-dimensional bar code, a two-dimensional bar code, or a quick response code.

Further, in the audio calibration system, the audio playback unit includes an in-ear headphone, a headphone, an air conduction hearing aid, a bone conduction hearing aid, or a middle ear implant.

Further, in the audio calibration system, the mobile computing device further includes a display unit, the display unit is coupled to the computing unit, and displays the sound pressure level, the first value, and the second value.

Further, in the audio calibration system, the audio command stores in the memory or the cloud server, and the audio control interface obtains the audio command from the memory or the cloud server.

Further, in the audio calibration system, the cloud server stores the sound pressure levels of the first test sound when a frequency at least one of 500 Hz, 1000 Hz, 2000 Hz, and 4000 Hz.

Further, in the audio calibration system, further include an identity recognition module is coupled to the cloud server, and the identity recognition module receives an identity recognition datum from the user, and adjusts an access authority of the computing unit to the sound pressure level stored in the cloud server according to the identity recognition datum.

Further, in the audio calibration system, the identity recognition datum includes e-mail information, password information, fingerprint information, palmar digital vein information, voiceprint information, face image information, or retina information.

Further, in the audio calibration system, the identity recognition module includes a server, a workstation, a fingerprint sensor, a finger vein sensor, a microphone, a camera, or a retina sensor.

When using the audio calibration system of the present disclosure, the audio generator retrieves the first test sound from the cloud server, and the audio generator plays the first test sound. At the same time, the computing unit of the mobile computing device generates the first value X after receiving the first test sound through a microphone. Afterward, the audio playback unit receives the audio commands from the audio control interface of the mobile computing device, and plays the second test sound to the microphone, and the computing unit generates the second value Y after receiving the second test sound through the microphone. Finally, the computing unit obtains the calibration value through the relational expression of Z+(Y−X) for the hearing detection device to perform the hearing detection procedure according to the calibration value and the audio playback unit. The relational expression of Z+(Y−X) means that no need to pre-calibrating the microphone and the audio playback unit, and the calibration value corresponding to the audio playback unit is obtained when the audio playback unit plays the first test sound stored in the cloud server. Since the present disclosure is not limited a specific microphone and a specific audio playback unit, users can use a general mobile computing device such as a laptop or a mobile phone, coupled with any pluggable audio playback unit to operate the present disclosure. The calibration value allows the mobile computing device to perform a dynamically adjustment according to different audio playback units, allowing the mobile computing device to continuously generate calibration values when the audio playback unit is plugged or unplugged. The present disclosure can take into account the personal hygiene of most users (audio playback unit as a headphone is not shared between different users) while avoiding the time consuming of users needing to make special reservations, going to professional testing places, or purchasing expensive professional testing equipment, so the present disclosure is convenient for users to perform hearing detection.

For this reason, the audio calibration system of the present disclosure can solve the prior art technical problems about must use some professional equipment that is fully calibrated to obtain hearing curves corresponding to different users in the prior art, which helps users save time and cost, so as to achieve the purpose of convenient to perform hearing detection for users.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

The technical content and detailed description of the present disclosure will be described below in conjunction with the drawings.

Figure 1:
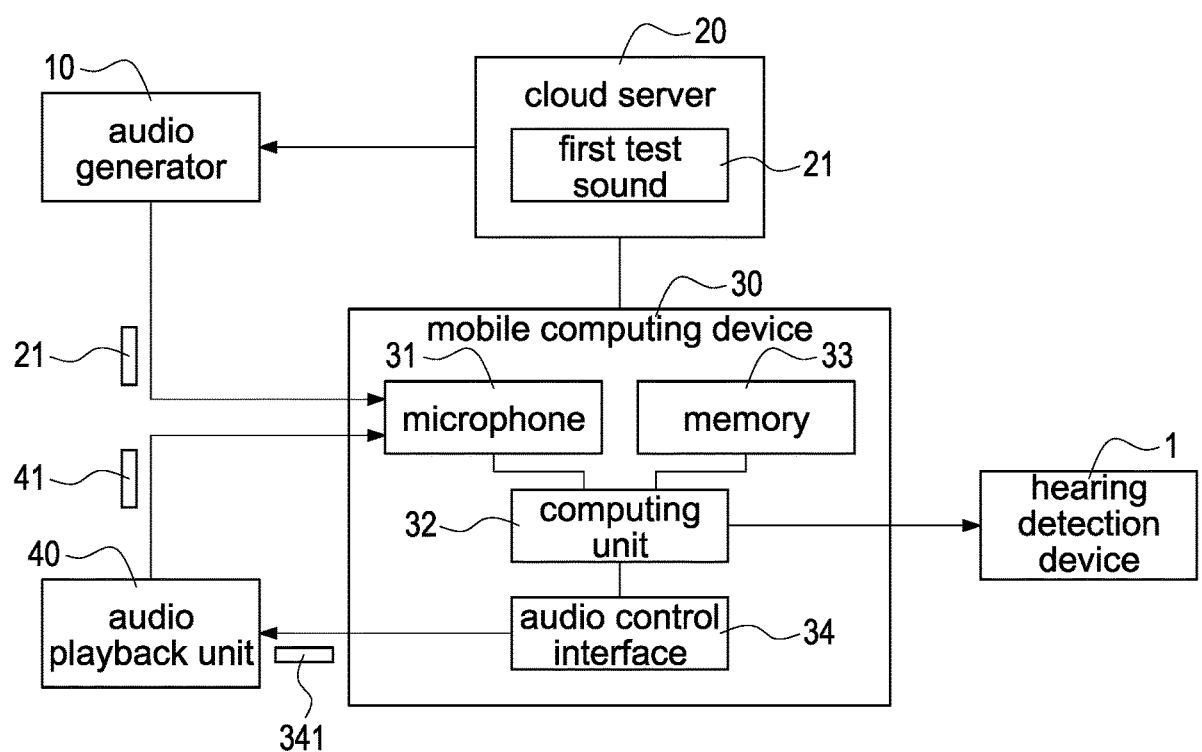
FIG. 1 and FIG. 2 are schematic diagrams of a first embodiment of an audio calibration system of the present disclosure.
Figure 2:
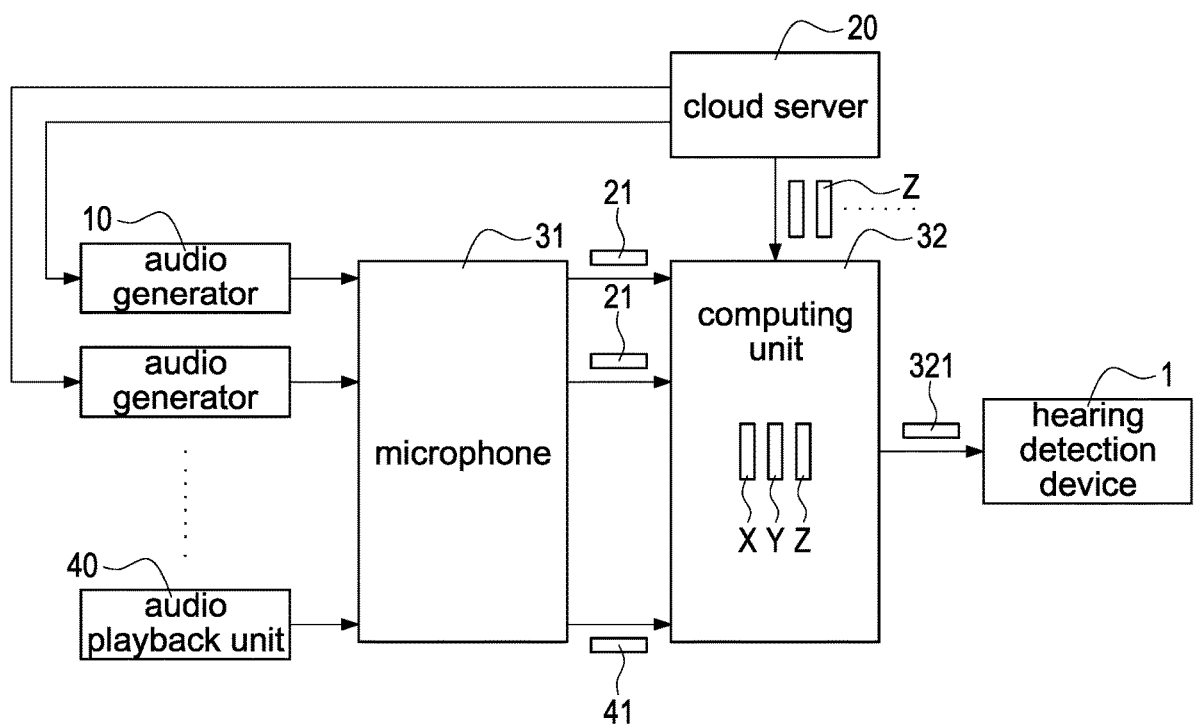

Please refer to FIG. 1 and FIG. 2, which are schematic diagrams of a first embodiment of an audio calibration system of the present disclosure.

An audio calibration system of the present disclosure is applied to a hearing detection device 1, and the audio calibration system includes an audio generator 10, a cloud server 20, a mobile computing device 30, and an audio playback unit 40. The audio generator 10 retrieves a first test sound 21 from the cloud server 20, and plays the first test sound 21. In the first embodiment of the present disclosure, the audio generator 10 is fully calibrated and have a fixed sound pressure. In physics, the sound pressure refers to an amount of pressure change caused by vibration when sound waves pass through a medium. When a sound wave propagates in the air as a longitudinal wave, the density and pressure between air particles will change with the sound wave, and this change is called the sound pressure. In the international system of units, the unit of sound pressure is Pascal (Pa).

The cloud server 20 may be selectively coupled to the audio generator 10 by a wired or a wireless manner. The cloud server 20 stores the first test sound 21, and a sound pressure level Z of the first test sound 21 at any frequency between 500 Hz and 4000 Hz. Further, the sound pressure level (SPL) refers to the "effective sound pressure" measured by a logarithmic scale relative to a reference value, with decibels (dB) as a unit. For normal hearing ability of ordinary humans, the most sensitive frequency range for hearing is between 2000 Hertz (Hz) and 5000 Hz, and a threshold of hearing is about $2\times10^{-5}$ Pa, so the threshold of hearing is usually used as a reference value for the SPL. That is, a sound needs to produce a pressure of at least about $2\times10^{-5}$ Pa before it can be felt by a young man with normal hearing. The sound pressure in the air may be measured with a microphone, and the sound pressure in water may be measured with a hydrophone. Further, the cloud server 20 can store the SPL of the first test sound 21 at least one of the frequencies of 500 Hz, 1000 Hz, 2000 Hz, and 4000 Hz, and the unit of the SPL is dB (SPL). In the first embodiment of the present disclosure, the sound pressure level Z may be 70 dB (SPL), and the cloud server 20 may be a workstation, a database, or a server.

In the first embodiment of the present disclosure, the number of the audio generator 10 is plural, the cloud server 20 stores a plurality of the sound pressure levels Z corresponding to different audio generator 10. A computing unit 32 obtains one of the sound pressure levels Z according to a product identification code (no shown) corresponding to any one of the audio generator 10. Further, the product identification code includes a character code, a one-dimensional bar code, a two-dimensional bar code, or a quick response code (QR code), and can be sold as a group with the audio generator 10.

The mobile computing device 30 is coupled to the cloud server 20. The mobile computing device 30 includes a microphone 31, the computing unit 32, a memory 33, and an audio control interface 34. The computing unit 32 is coupled to the microphone 31, the memory 33, and the audio control interface 34. The computing unit 32 generates a first value X after receiving the first test sound 21 played by the audio generator 10 through the microphone 31. Simultaneously or successively, the computing unit 32 generates a second value Y after receiving a second test sound 41 through the microphone 31. The memory 33 stores the first value X and the second value Y. The audio control interface 34 outputs an audio command 341 to the audio playback unit 40 outside the mobile computing device 30. The audio command 341 may be stored in the memory 33 or the cloud server 20, and the audio control interface 34 obtains the audio command 341 from the memory 33 or the cloud server 20.

Further, the microphone 31 may be a general dynamic microphone, a condenser microphone, an electret condenser microphone, a microelectromechanical microphone (mems microphone), an aluminum ribbon microphone, and carbon microphone. Moreover, the microphone 31 operates in modes of an omnidirectional, cardioid/hyper cardioid, or bi-directional/figure-of-8. The computing unit 32 may include one of a microcontroller (MCU), a microprocessor (MPU), a central processing unit (CPU), an application-specific integrated circuit (ASIC), and a system-on-chip (SoC). The microcontroller may also include a circuit board based on the Arduino machine code architecture. The system-on-chip may be also a Raspberry Pi, and its model can be 1A, 1A+, 1B, 1B+, 2B, 3B, 3B+, 3A+, or 4B. The memory 33 is an EEPROM, a NAND Flash, or other non-volatile data storage medium.

The audio control interface 34 may be an application software that can be installed in the mobile computing device 30, for example, the mobile computing device 30 may be a smart phone, a laptop, a personal digital assistant (PDA), etc. The audio control interface 34 may be an application program installed through portal sites such as Apple Store or Google Play. However, the foregoing is only illustrative, and the present disclosure is not limited thereof.

The audio playback unit 40 is removably coupled to the mobile computing device 30, and the audio playback unit 40 receives the audio command 341 from the audio control interface 34, and plays the second test sound 41 to the microphone 31. The audio playback unit 40 includes a speaker, an in-ear headphone, a headphone, an air conduction hearing aid, a bone conduction hearing aid, or a middle ear implant. The speakers may be also electrodynamic speakers, electromagnetic speakers, piezoelectric speakers, electrode speakers, or plasma arc speakers. However, the present disclosure is not limited thereof. The computing unit 32 obtains a calibration value 321 through the relational expression of Z+(Y−X) for the hearing detection device 1 to perform a hearing detection procedure according to the calibration value 321 and the audio playback unit 40. In practice, both the mobile computing device 30 (such as a mobile phone) and the audio playback unit 40 (such as a headphone) may be switched for the hearing detection procedure after an audio calibration is completed, and the hearing detection procedure can be performed directly without an external device. However, the present disclosure is not limited thereof.

Figure 3:
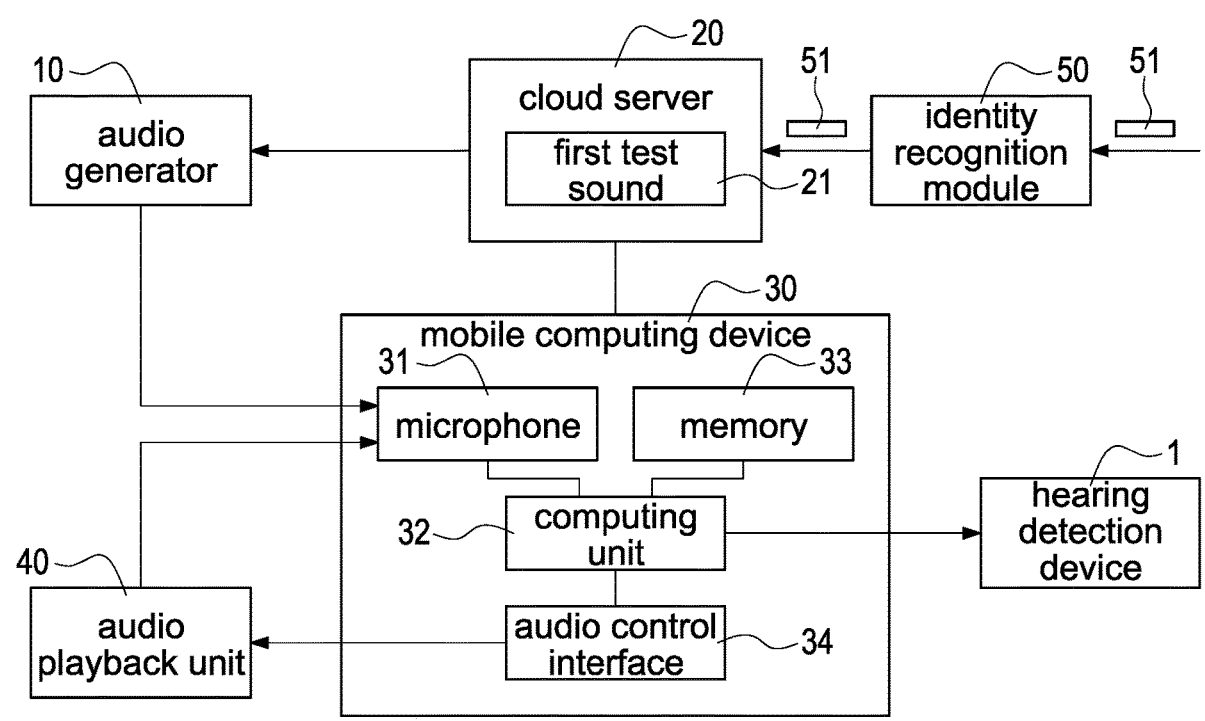
FIG. 3 is a schematic diagram of a second embodiment of the audio calibration system of the present disclosure.

Please refer to FIG. 3, which is a schematic diagram of a second embodiment of the audio calibration system of the present disclosure. The second embodiment of the present disclosure is substantially the same as the first embodiment of the present disclosure, except that the audio calibration system further includes an identity recognition module 50 is coupled to the cloud server 20. The identity recognition module 50 receives an identity recognition datum 51 from the user (no shown), and adjusts an access authority of the computing unit 32 to the sound pressure level Z stored in the cloud server 20 according to the identity recognition datum 51. In the second embodiment of the present disclosure, the identity recognition datum 51 includes e-mail information, password information, fingerprint information, palmar digital vein information, voiceprint information, face image information, or retina information. The identity recognition module 50 includes a server, a workstation, a fingerprint sensor, a finger vein sensor, a microphone, a camera, or a retina sensor. However, the present disclosure is not limited thereof.

Figure 4:
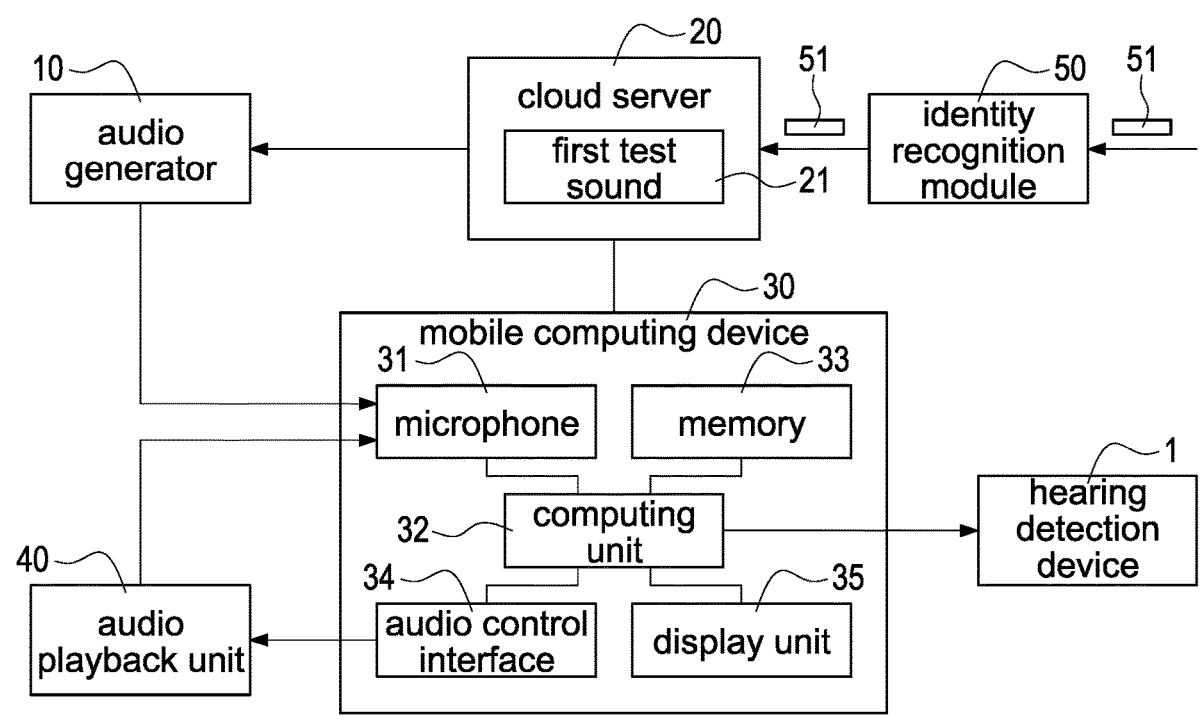
FIG. 4 is a schematic diagram of a third embodiment of the audio calibration system of the present disclosure.

Please refer to FIG. 4, which is a schematic diagram of a third embodiment of the audio calibration system of the present disclosure. The third embodiment of the present disclosure is substantially the same as the first embodiment of the present disclosure, except that the audio calibration system further includes a display unit 35. The display unit 35 is coupled to the computing unit 32, and displays the sound pressure level Z, the first value X, and the second value Y. The display unit 35 may be composed of a liquid crystal display (LCD), a light emitting diode (LED), an organic light emitting diode (OLED), a quantum dot organic light emitting diode (QD-OLED), a mini-LED, a micro-LED, an indium gallium zinc oxide (IGZO), or an electronic paper (e-Paper). However, the present disclosure is not limited thereof.

When the user uses the audio calibration system of the present disclosure, the audio generator 10 retrieves the first test sound 21 from the cloud server 20, and plays the first test sound 21. At the same time, the computing unit 32 of the mobile computing device 30 generates the first value X after receiving the first test sound 21 through a microphone 31. Afterward, the audio playback unit 40 receives the audio command 341 from the audio control interface 34 of the mobile computing device 30, and plays the second test sound 41 to the microphone 31. The computing unit 32 generates the second value Y after receiving the second test sound 41 through the microphone 31. Finally, the computing unit 32 obtains the calibration value 321 through the relational expression of Z+(Y−X) for the hearing detection device 1 to perform the hearing detection procedure according to the calibration value 321 and the audio playback unit 40. The relational expression of Z+(Y−X) means that the calibration value 321 corresponding to the audio playback unit 40 is obtained under the absence of the microphone 31 and the audio unit 40 which are pre-calibrated when the audio playback unit 40 plays the first test sound 21 stored in the cloud server 20. Since the present disclosure is not limited a specific microphone and a specific audio playback unit, users can use a general mobile computing device 30 such as a laptop or a mobile phone, coupled with any pluggable audio playback unit 40 to operate the present disclosure. The calibration value 321 allows the mobile computing device 30 to perform a dynamically adjustment according to different audio playback units 40, allowing the mobile computing device 30 to continuously generate calibration values 321 when the audio playback unit 40 is plugged or unplugged. The present disclosure can take into account the personal hygiene of most users (audio playback unit 40 as a headphone is not shared between different users) while avoiding the time consuming of users needing to make special reservations, going to professional testing places, or purchasing expensive professional testing equipment, so the present disclosure is convenient for users to perform hearing detection.

For this reason, the audio calibration system of the present disclosure can solve the prior art technical problems about must use some professional equipment that is fully calibrated to obtain hearing curves corresponding to different users in the prior art, which helps users save time and cost, so as to achieve the purpose of convenient to perform hearing detection for users.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that can be easily conceived by those skilled in the art in the field of the present disclosure can be covered by the following claims.

It should be understood that the structures, the proportions, the sizes, the number of components, and the like in the drawings are only used to cope with the contents disclosed in the specification for understanding and reading by those skilled in the art, and it is not intended to limit the conditions that can be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

What is claimed is:

1. An audio calibration system applied to a hearing detection device, the audio calibration system comprising:
   an audio generator configured to play a first test sound, and a sound pressure level of the first test sound at any frequency between 500 Hz and 4000 Hz being Z,
   a cloud server,
   a mobile computing device coupled to the cloud server, the mobile computing device comprising a microphone, a computing unit, a memory, and an audio control interface, and the computing unit coupled to the microphone, the memory, and the audio control interface; wherein the computing unit is configured to generate a first value X after receiving the first test sound played by the audio generator through the microphone, and the computing unit is configured to generate a second value Y after receiving a second test sound through the microphone, the memory is configured to store the first value X and the second value Y, and the audio control interface is configured to output an audio command outside the mobile computing device, and
   an audio playback unit removably coupled to the mobile computing device, the audio playback unit configured to receive the audio command from the audio control interface, and play the second test sound to the microphone,
   wherein, the computing unit is configured to obtain a calibration value through a relational expression of Z+(Y−X) for the hearing detection device to perform a hearing detection procedure according to the calibration value and the audio playback unit.

2. The audio calibration system as claimed in claim 1, wherein the number of the audio generator is plural, the cloud server is configured to store a plurality of the sound pressure levels corresponding to different audio generators, and the computing unit is configured to obtain one of the sound pressure levels from the cloud server according to a product identification code corresponding to any one of the audio generators, or the computing unit is configured to directly read contents of the product identification code to obtain one of the sound pressure levels.

3. The audio calibration system as claimed in claim 2, wherein the product identification code comprises a character code, a one-dimensional bar code, a two-dimensional bar code, or a quick response code.

4. The audio calibration system as claimed in claim 1, wherein the audio playback unit comprises an in-ear headphone, a headphone, an air conduction hearing aid, a bone conduction hearing aid, or a middle ear implant.

5. The audio calibration system as claimed in claim 1, wherein the mobile computing device further comprises:
   a display unit coupled to the computing unit, and the display unit configured to display the sound pressure level, the first value, and the second value.

6. The audio calibration system as claimed in claim 1, wherein the audio command is configured to store in the memory or the cloud server, and the audio control interface is configured to obtain the audio command from the memory or the cloud server.

7. The audio calibration system as claimed in claim 1, wherein the cloud server is configured to store the sound pressure levels of the first test sound when a frequency at least one of 500 Hz, 1000 Hz, 2000 Hz, and 4000 Hz.

8. The audio calibration system as claimed in claim 1, further comprising:
   an identity recognition module coupled to the cloud server, and the identity recognition module configured to receive an identity recognition datum from a user, and configured to adjust an access authority of the computing unit to the sound pressure level stored in the cloud server according to the identity recognition datum.

9. The audio calibration system as claimed in claim 8, wherein the identity recognition datum comprises e-mail information, password information, fingerprint information, palmar digital vein information, voiceprint information, face image information, or retina information.

10. The audio calibration system as claimed in claim 8, wherein the identity recognition module comprises a server, a workstation, a fingerprint sensor, a finger vein sensor, a microphone, a camera, or a retina sensor.

* * * * *